United States Patent
Steeby

[11] Patent Number: 5,429,559
[45] Date of Patent: Jul. 4, 1995

[54] FORCED ENGAGEMENT LOGIC
[75] Inventor: Jon A. Steeby, Schoolcraft, Mich.
[73] Assignee: Eaton Corporation, Cleveland, Ohio
[21] Appl. No.: 155,314
[22] Filed: Sep. 22, 1993
[51] Int. Cl.$^6$ ............................................. F16H 5/46
[52] U.S. Cl. .......................................... 477/80; 477/81; 477/125; 74/336 R
[58] Field of Search .................. 477/77, 78, 79, 80, 477/81, 906, 123, 124, 125; 74/335, 336 R

[56] References Cited

U.S. PATENT DOCUMENTS

| | | | |
|---|---|---|---|
| 5,261,288 | 11/1993 | Menig | 74/335 |
| 5,261,298 | 11/1993 | Markyvech | 477/110 |
| 5,335,566 | 8/1994 | Genise et al. | 74/355 X |

Primary Examiner—Charles A. Marmor
Assistant Examiner—Peter Kwon
Attorney, Agent, or Firm—Howard D. Gordon

[57] ABSTRACT

A control system/method (104) for controlling execution of selected shifts of a mechanical transmission system (10) is provided. The control system includes a central processing unit (106) for receiving input signals indicative of engine or input shaft (11/98) speeds and of output shaft or vehicle speed (VS) speeds and from a driver control console (108) indicative of manual or automatic selection of upshifts or downshifts from a currently engaged gear ratio and processing the same in accordance with predetermined logic rule to issue command output signals to a transmission actuator (112, 70, 96) to implement the selected shifts upon a manually or automatically caused torque break of the transmission and manually or automatically caused substantial synchronization of the transmission thereafter. The predetermined logic rules include a strategy for sensing conditions indicative of a potentially dangerous downhill free-wheeling situation and for immediately causing the forced engagement of a gear ratio ($GR_{FE}$) determined as a function of vehicle speed regardless of the presence or absence of substantially synchronous conditions.

14 Claims, 5 Drawing Sheets

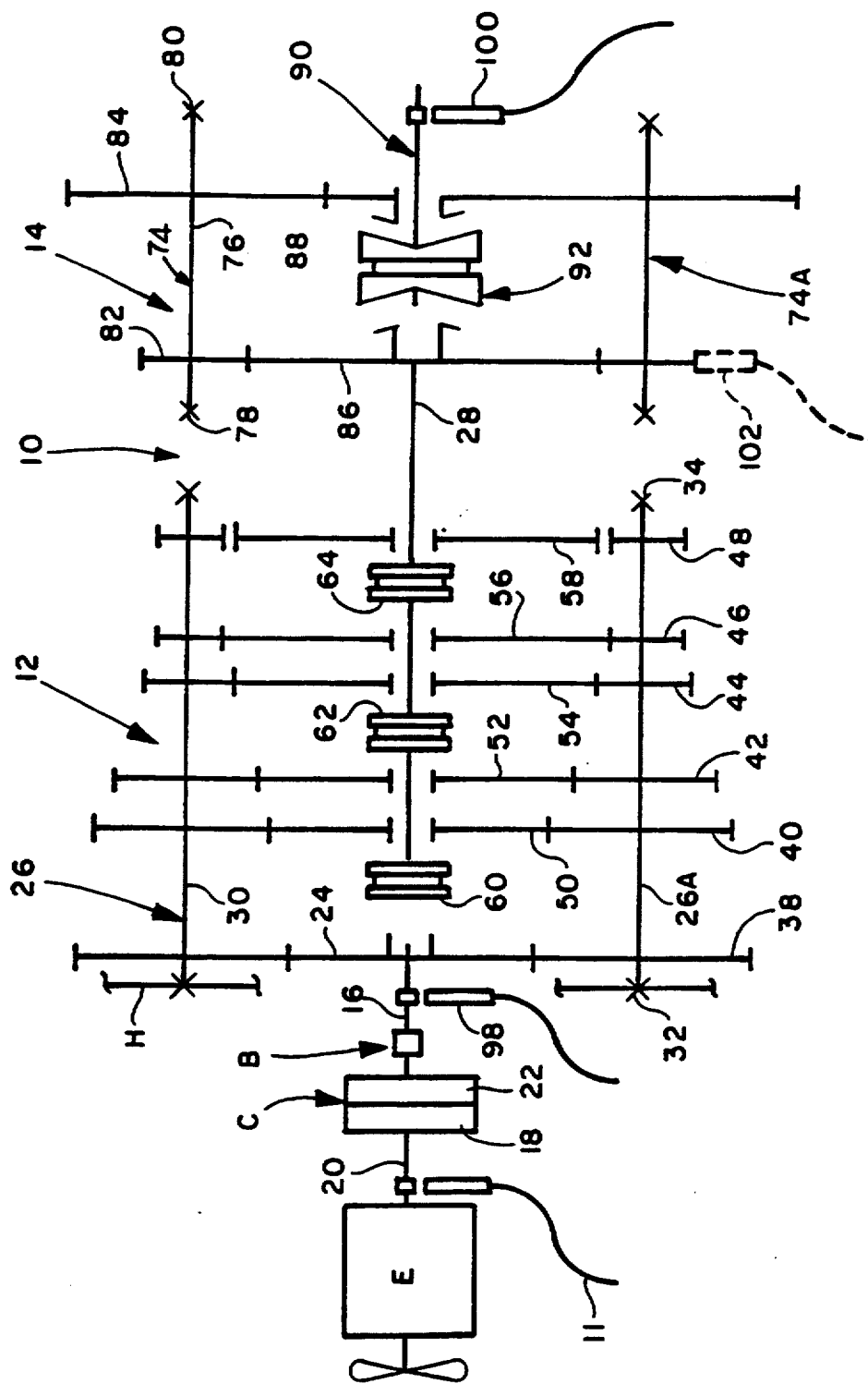

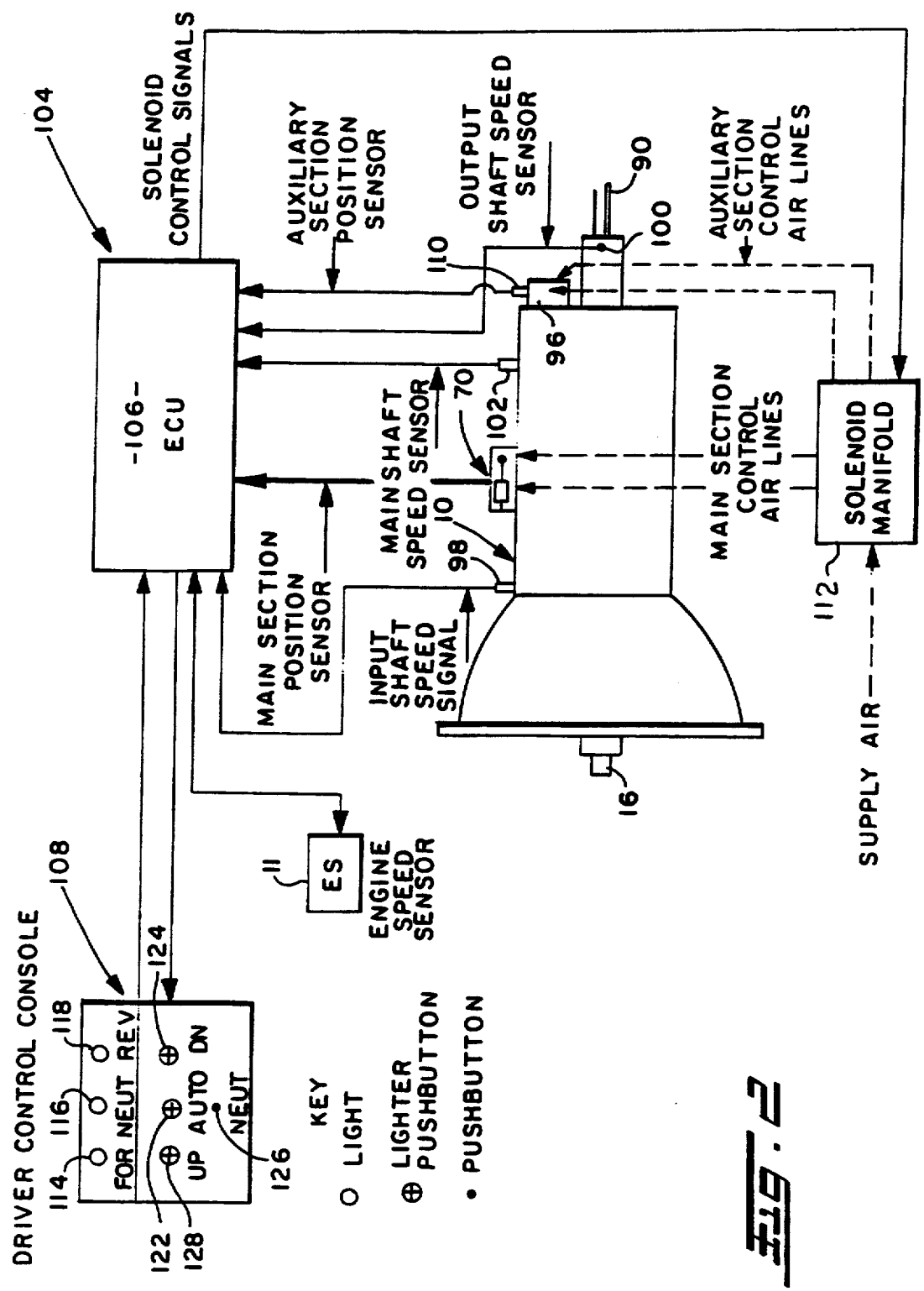

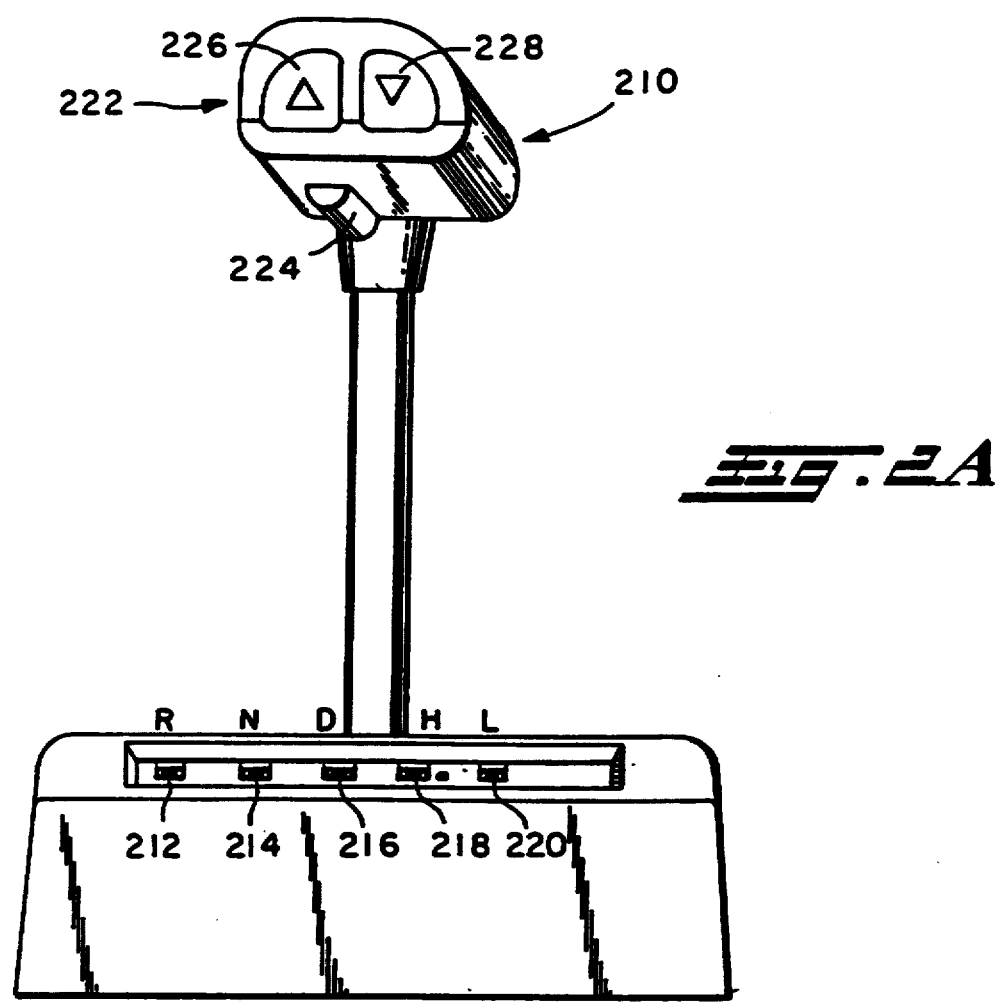

FORCED ENGAGEMENT LOGIC

BACKGROUND OF THE INVENTION

1. Related Applications

This application is related to allowed, co-pending U.S. patent application Ser. No. 07/993,332 titled ENHANCED MISSED SHIFT FROM NEUTRAL RECOVERY FOR AUTOMATED OR SEMI-AUTOMATED MECHANICAL TRANSMISSION SYSTEM and assigned to the same assignee, Eaton Corporation, as this application.

2. Field of the Invention

This invention relates to vehicular automatic or partially automatic mechanical transmission systems and, in particular, to partially automatic mechanical transmission systems of the type providing partially automatic implementation of manually or automatically selected changes or shifting of mechanical transmission gear ratios.

More particularly, the present invention relates to a control system which enhances recovery from missed shifts in a partially automatic shift implementation requiring the vehicle operator or system controller to create synchronous or substantially synchronous conditions for engagement of the transmission nonsynchronized jaw clutches.

3. Description of the Prior Art

Fully automatic transmission systems, both for heavy-duty vehicles such as heavy-duty trucks, and for automobiles, that sense throttle openings or positions, vehicle speeds, engine speeds, and the like, and automatically shift the vehicle transmission in accordance therewith, are well known in the prior art. Such fully automatic change gear transmission systems include automated transmissions wherein pressurized fluid is utilized to frictionally engage one or more members to other members or to a ground to achieve a selected gear ratio as well as automated mechanical transmissions utilizing electronic and/or pneumatic logic and actuators to engage and disengage mechanical (i.e. positive) clutches to achieve a desired gear ratio. Examples of such transmissions may be seen by reference to U.S. Pat. Nos. 3,961,546; 4,081,065 and 4,361,060, the disclosures of which are hereby incorporated by reference.

Such fully automatic change gear transmissions can be unacceptably expensive, particularly for the largest heavy-duty vehicles which are not typically sold in high volumes. Additionally, those automatic change gear transmissions utilizing pressurized fluid and/or torque converters tend to be relatively inefficient in terms of power dissipated between the input and output shafts thereof.

Semi-automatic transmission systems utilizing electronic control units which sense throttle position, engine, input shaft, output shaft and/or vehicle speed, and utilize automatically controlled fuel throttle devices, gear shifting devices and/or master clutch operating devices to substantially fully automatically implement operator manually selected transmission ratio changes are known in the prior art. Examples of such semi-automatic transmission systems may be seen by reference to U.S. Pat. Nos. 4,425,620; 4,631,679 and 4,648,290, the disclosures of which are incorporated herein by reference.

While such semi-automatic mechanical transmission systems are very well received as they are somewhat less expensive than fully automatic transmission systems, allow manual clutch control for low speed operation and/or do not require automatic selection of the operating gear ratio, they may be too expensive for certain applications as a relatively large number of sensors and automatically controllable actuators, such as a master clutch and/or a fuel throttle device actuator, are required to be provided, installed and maintained.

Semi-automatic shift implementation systems/methods for mechanical transmission systems for use in vehicles having a manually only controlled engine throttle means, and a manually only controlled master clutch, have been proposed. Such systems may be seen by reference to U.S. Pat. Nos. 5,053,959; 5,053,961; 5,053,962; 5,063,511; 5,050,079; 5,081,588; 5,089,962 and 5,105,357, the disclosures of which are incorporated herein by reference.

These systems may include a control/display panel or console for operator selection of upshifts, downshifts or shifts into neutral, an electronic control unit (ECU) for receiving input signals indicative of engaged gear ratio, transmission input shaft, main shaft and/or output shaft speeds and of manually selected shifts and for processing same in accordance with predetermined logic rules to issue command output signals and a transmission actuator for shifting the transmission in, accordance with the command output signals. The control/display device will typically allow the operator to select/preselect a shift into a higher ratio, a lower ratio or into neutral and will display the selected but not yet implemented shift as well as the current status of the transmission.

A concern with such automated and semi-automated systems, especially partially or semi-automatic mechanical transmission system requiring an operator to manually bring the transmission within an acceptable range of synchronous conditions (usually called the "synchronous window") before the control allows or commands engagement of a target gear ratio, is that the ranges are set at relatively small bands, to increase shift quality, which may result in the operator missing the band and becoming stuck in neutral, which is usually very undesirable.

According to the control of above-mentioned U.S. Pat. No. 5,063,511, if the selected shift is not implemented within a given period of time, the control logic will assume that the operator has missed the shift and will increase the bands or ranges to allow for a harsher shift which enhances the probability that the operator's efforts will result in implementation of the selected shift.

While the missed shift recovery system/method of above-mentioned U.S. Pat. No. 5,063,551 does considerably enhance the probability of recovering from a missed shift from neutral into a desirable target ratio, a shift into the selected desirable target ratio may remain unaccomplished.

According to the control of above-mentioned, allowed, co-pending patent application Ser. No. 07/993,332, a missed shift recovery method/system is provided which will provide an alternative for and/or a supplement to the missed shift recovery system/method of above-mentioned U.S. Pat. No. 5,063,551. According to that missed shift recovery system/method, if a shift from neutral into a desirable target ratio is not implemented within a given period of time as a result of a failure to achieve substantially synchronous conditions, the system control will determine a missed shift recovery target ratio, as a function of current engine and vehicle speed, and will then attempt to implement engagement of that ratio. The missed shift recovery target ratio ($GR_{MSR}$) is selected so that the calculated engine speed at current vehicle speed and master clutch lockup ($ES_{CALC}=OS_{CURRENT}*GR_{MSR}$) will be within the range of allowable engine speeds ($ES_{MIN}<ES_{CALC}<ES_{MAX}$) and will minimize the absolute value of the expression $ES_{CURRENT}-ES_{CALC}$.

While the above-discussed two missed shift recovery strategies, separately or in combination, are effective in many situations, they are not totally satisfactory as they are based upon time in neutral, not vehicle speed or change in vehicle speed, while in neutral and attempting to complete a shift. Also, the prior art strategies require that a somewhat synchronous condition exist for engagement of a transmission gear ratio.

SUMMARY OF THE INVENTION

In accordance with the present invention, a forced engagement strategy for recovery from a missed shift is provided which will provide an alternative for and/or a supplement to one or both of the missed shift recovery strategies discussed above.

According to the forced engagement method/system of the present invention, during a shift into a selected target gear ratio, the initial speed of the vehicle (as indicated by transmission output shaft speed OS) is sensed at the time of initial confirmation of neutral and awaiting substantially synchronous conditions for engaging the selected target gear ratio ($GR_T$). Thereafter, independent of time, if the current vehicle speed ($VS_C$) exceeds the greater of (i) a reference speed (about 30 MPH) or (ii) the sum of initial speed plus a predetermined maximum allowable speed change ($VS_i$ plus $\Delta VS_{max}$), then the logic will select a forced engagement gear ratio ($GR_{FE}$) as a function of current vehicle speed ($VS_C$) and allowable engine speeds and will cause that ratio, $GR_{FE}$, to be engaged regardless of the presence or absence of synchronous conditions therefor.

Satisfactory operation has been achieved when the maximum allowable speed change ($\Delta VS_{max}$) will have a value of about 6 MPH to 12 MPH and may be fixed or may vary with initial vehicle speed and/or value of the target gear ratio. Also, to prevent an immediate need to upshift after a forced engagement, if more than one gear ratio will provide acceptable engine speeds (ES=OS*GR) at current vehicle speed, a ratio lower than the highest speed ratio will be selected as the forced engagement gear ratio ($GR_{FE}$) or, alternatively, a ratio closest synchronization with the current engine speed may be selected.

The above method has been found to quickly and accurately detect those situations, such as free-wheeling downhill in mountainous terrain, where forced engagement is required without frequently unnecessarily evoking the forced engagement. Due to the potentially harsh and damaging nature of a forced engagement, it is, of course, desirable to minimize, to the, extent possible, the unnecessary occurrences thereof.

By providing the above-described forced engagement strategy, preferably in addition to less harsh missed shift strategies, the highly undesirable condition of continuing free-wheeling downhill while attempting to achieve synchronous for engagement of a selected target gear ratio is detected and, about somewhat harshly, responded to.

This and other objects and advantages of the present invention will become apparent from a reading of the detailed description of the preferred embodiment taken in connection with the attached drawings.

BRIEF DESCRIPTION OF THE DRAWINGS

FIG. 1 is a schematic illustration of the vehicular mechanical transmission system partially automated by the system of the present invention.

FIG. 2 is a schematic illustration of the semi-automatic shift implementation system for a mechanical transmission system of the present invention.

FIG. 2A is an elevational view of an alternate driver control for the transmission system of FIG. 2.

DESCRIPTION OF THE PREFERRED EMBODIMENT

Figure 3:
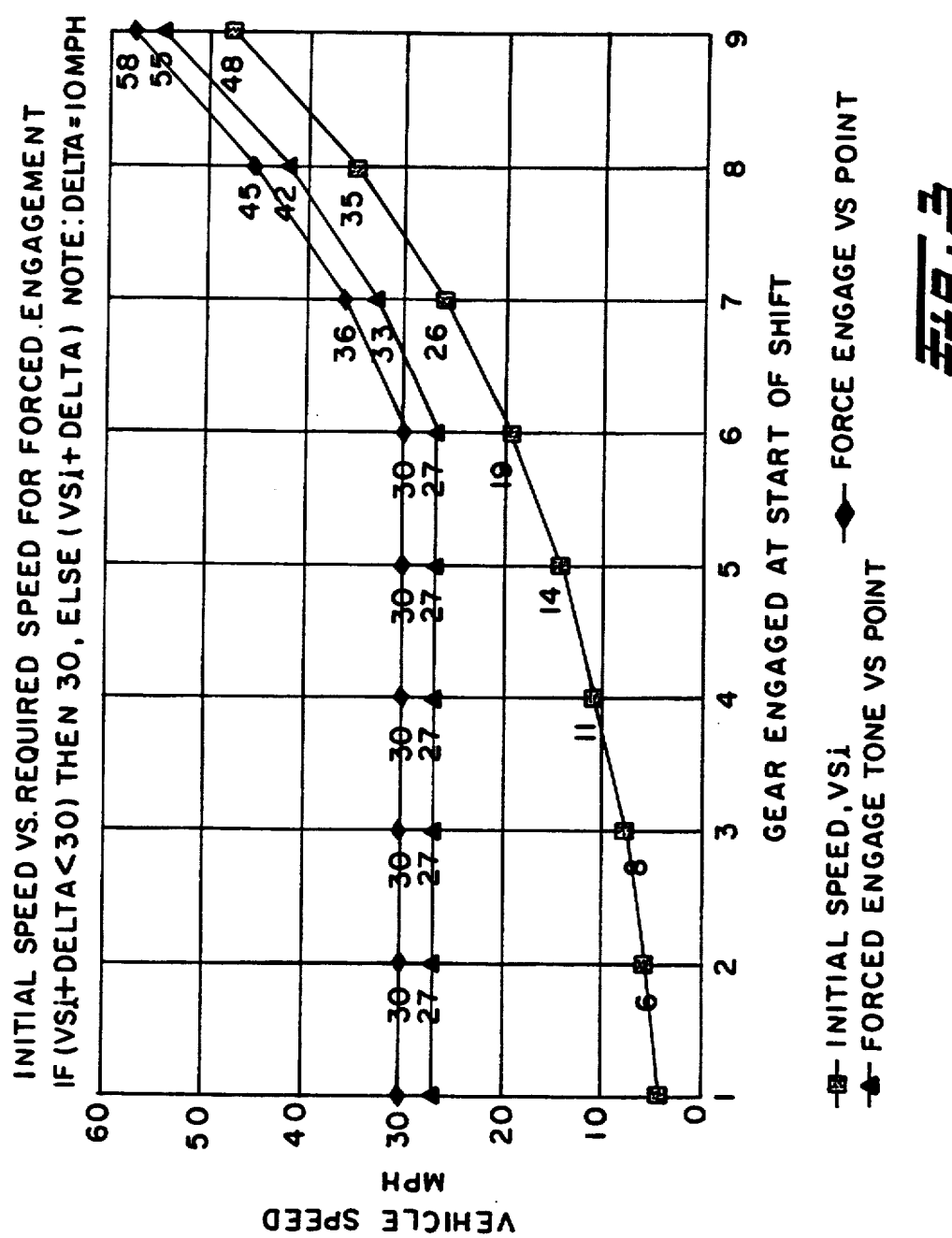
FIG. 3 is a schematic illustration of initial vehicle speed and current vehicle speed for forced engagement.

Certain terminology will be used in the following description for convenience in reference only and will not be limiting. The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

Signals indicative of engine speed will include signals from engine speed sensors, signals from input shaft speed sensors and signals such output shaft and gear ratio signals which may be used to calculate (ES=OS*GR) and/or estimate engine speed.

Referring to FIG. 1, a range type compound transmission 10 of the type partially automated by the semi-automatic mechanical transmission system of the present invention is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually or automatically controlled throttle device (not shown) and the master clutch C is manually controlled by a clutch pedal (not shown) or automatically controlled by a clutch actuator, or the like. An input shaft brake B, usually operated by overtravel of the clutch pedal, is preferably provided to provide quicker upshifting as is well known in the prior art.

Transmissions similar to compound mechanical transmission 10 are well known in the prior art and may be appreciated by reference to U.S. Pat. Nos. 3,105,395; 3,283,613; 4,735,109 and 4,754,665, the disclosures of which are incorporated herein by reference. A sensor 11 may be provided for sensing the rotational speed of the engine and providing a signal indicative thereof.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 may be actuated by electric motors or by compressed fluid, such as compressed air, and is of the type automatically controllable by a control unit as may be seen by reference to U.S. Pat. Nos. 4,445,393; 4,555,959; 4,361,060; 4,676,115; 4,873,881 and 4,899,607, the disclosures of which are incorporated herein by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in thee high transmission range. Accordingly, while main transmission section 12 does provide five forward speeds, it is usually referred to as a "four plus one" main section as only four of the forward speeds are compounded by the auxiliary range transmission section 14 utilized therewith. Similar transmissions provide 10, 13, 16 or 18 forward speeds as may be seen by reference to U.S. Pat. Nos. 4,754,665 and 4,974,468.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to simple transmissions and to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershift type.

The semi-automatic shift implementation control system 104 for a mechanical transmission system of the present invention is schematically illustrated in FIG. 2. Control system 104, in addition to the mechanical transmission system 10 described above, includes an electronic control unit 106, preferably microprocessor based, for receiving input signals from the engine speed sensor 11, input shaft speed sensor 98, from the output shaft speed sensor 100 (or, alternatively, the mainshaft speed sensor 102) and from the driver control console 108. The ECU 106 may also receive inputs from an auxiliary section position sensor 110.

The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108. ECU's of this type are well known in the prior art as may be seen by reference to U.S. Pat. No. 4,595,986, the disclosure of which is incorporated herein by reference.

The driver control and display console allows the operator to select a manual or hold mode of operation for manually selecting a shift in a given direction (i.e. upshifts or downshifts) or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

An alternate to the control console 108 is illustrated in FIG. 2A. Briefly, a mode selector 210 is utilized to select reverse (R) 212, neutral (N) 214, drive (automatic) (D) 216, hold (manual) (H) 218 and low (L) 220. The mode selector includes a handle 222 having a reverse interlock release button 224 and upshift 226 and downshift 228 selection buttons. The function of mode selector 210 is substantially identical to console 108 described above.

To implement a selected shift, the manifold 112 is preselected to cause actuator 70 to be biased to shift main transmission section 12 into neutral. This is accomplished by the operator causing a torque break or reversal by manually momentarily decreasing and/or increasing the supply of fuel to the engine and/or manually disengaging the master clutch C. As the transmission is shifted into neutral, and neutral is verified by the ECU (neutral sensed for a period of time such as 1.5 seconds), the neutral condition indicia button 116 is lighted. If the selected shift is a compound shift, i.e. a shift of both the main section 12 and of the range section 14, such as a shift from 4th to 5th speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As the operator, or a control unit, by throttle manipulation and/or use of the input shaft brake, causes the input shaft speed to fall within the acceptable range, the ECU 106 will issue command output signals to manifold 112 to cause actuator 70 to engage the mainsection ratio to be engaged. Preferably, the actuator will respond very quickly not requiring the operator to maintain the input shaft speed within the acceptable range for an extended period of time. To select a shift into transmission neutral, selection button 126 is pushed. Indicating light 116 will flash until the ECU confirms that neutral is obtained at which time the light 116 will assume a continuously lighted condition while the transmission remains in neutral.

In the control algorithms, the issuing of command output signals for engagement of a target gear is dependent upon the transmission (i.e. the input shaft) being manually brought to within an acceptable synchronous point. This synchronous point is usually a range of RPMs (error band) centered about an error of zero RPM (i.e. when input shaft speed equals the product of output shaft speed times the numerical value of the target gear ratio, $IS=OS*GR_T$). When the control electronics sense that the input shaft speed falls within the error band it will fire the solenoid of manifold 112 that will cause the target gear to be engaged. The error bands are selected to give the best shift quality for each gear ratio. These error bands are usually stored in software in the form of tables that are indexed as a function of target gear. When these tables are set up for best shift quality the bands must be made small to minimize "clunking" as the target gear is engaged. With small error bands it is more difficult for the driver to bring the transmission to the correct synchronous point and he may miss it altogether and end up in neutral.

Above-mentioned U.S. Pat. No. 5,063,511 provided a missed shift recovery algorithm that will access a second set of tables a short time after neutral has been sensed (one second). In a normal shift, one second is ample time for the driver to have brought the transmission to the synchronous point. If the neutral state has existed for more than the allowed time the algorithms will assume the driver has missed the shift and call for the new set of tables. This second set of tables will open the error bands to allow for a harsher shift which enhances the probability that the driver's efforts will result in engagement of the target gear instead of remaining in a neutral state.

In the automatic preselection mode of operation, selected by use of lighted pushbutton 122, or by moving selector 210 to the "D" position, the ECU will, based upon stored logic rules, currently engaged ratio (which may be calculated by comparing input shaft to output shaft speed) and output shaft speed, determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator may initiate semi-automatic implementation of the automatically preselected shift as indicated above or may cancel the automatic mode by depression of pushbutton 122.

According to the missed shift recovery system/method of above-mentioned, allowed, co-pending U.S. Ser. No. 07/993,332, if a shift from neutral into a desirable target ratio is not implemented within a given period of time as a result of a failure to achieve substantially synchronous conditions, the system control will determine a missed shift recovery target ratio, as a function of current engine and vehicle speed, and will then attempt to implement engagement of that ratio. The period of time may be measured from an initial attempt to engage the desirable target ratio, or may occur only after the missed shift recovery method/system of above-mentioned U.S. Pat. No. 5,063,557 has been unsuccessfully attempted.

While the above-discussed missed shift strategies will adequately resolve most missed shift situations, the forced engagement system/method of the present invention is provided to prevent situations such as a rapidly moving and/or accelerating vehicle continuing to descend a steep mountainous grade in a free wheeling condition while the operator or system controller attempts to achieve synchronous for engagement of the selected target gear ratio.

According to the forced engagement strategy of the present invention, open sensing a forced engagement situation, a forced engagement gear ratio $GR_{FE}$ is determined on the basis of current output shaft speed and the acceptable ranges of engine speed, and that ratio is immediately caused to be engaged regardless of the possible lack of synchronous conditions. As this forced engagement will potentially result in harsh, objectionable and/or damaging shocks to the drive line, it is important to develop a reliable routine for quickly and reliably detecting such conditions which will minimize the occurrences of unnecessarily implementing the forced engagement routine.

It has been determined that conditions requiring a forced engagement response can be detected by comparing current vehicle speed ($VS_C$) to the initial vehicle speed ($VS_i$) at the time when the vehicle was shifted to neutral and ready for engagement of the target gear ratio. If current vehicle speed equals or exceeds the greater of (i) a reference speed (about 30 MPH) or (ii) the sum of initial speed ($VS_i$) plus a maximum allowable speed change ($\Delta VS_{max}$), equal to about 6 MPH to 12 MPH, this is indicative of a requirement for forced engagement of the forced engagement gear ratio, $GR_{FE}$. Referring to FIG. 3, line 200 represents various initial vehicle speed values while line 202 represents the corresponding current vehicle speeds at which the forced engagement sequence will be implemented. Line 204 represents the current vehicle speeds at which a forced engagement warning, such as an audible warning, will be given to allow the operator to again attempt to create synchronous conditions for engagement of a target ratio and/or to prepare for the potentially harsh forced engagement of the forced engagement gear ratio.

As is very well known, in a heavy duty multiple speed mechanical transmission having 9, 10, 12, 13, 16 19 or 20 selectable forward gear ratios (GR), for many vehicle speeds, 3, 4 or 5 of the ratios are permissibly engageable (i.e. at current vehicle speed, and at master clutch (C) lockup, the calculated engine speed (ES=G-R*OS) will be above a minimum value ($ES_{MIN}$) and below a maximum value ($ES_{MAX}$). The minimum value ($ES_{MIN}$) is usually about the stall speed of the engine while the maximum value ($ES_{MAX}$) is slightly below a destructive speed. For a typical vehicular heavy duty diesel engine, the minimum speed is usually about 600 RPM, the maximum speed is about 2200 RPM and the desirable range is about 1400-1800 RPM. In determining the forced engagement gear ratio, if more than one ratio is permissibly engagement, to minimize harshness and prevent a need for immediate upshifting, one or more ratio lower than the highest allowable speed ratio will be selected as the forced engagement ratio. By way of example, if based upon sensed vehicle speed (OS), 6th, 7th, 8th and 9th speeds are all engageable, 7th or possibly 8th speed, but not 9th speed, will be selected as the forced engagement ratio.

Figure 4:
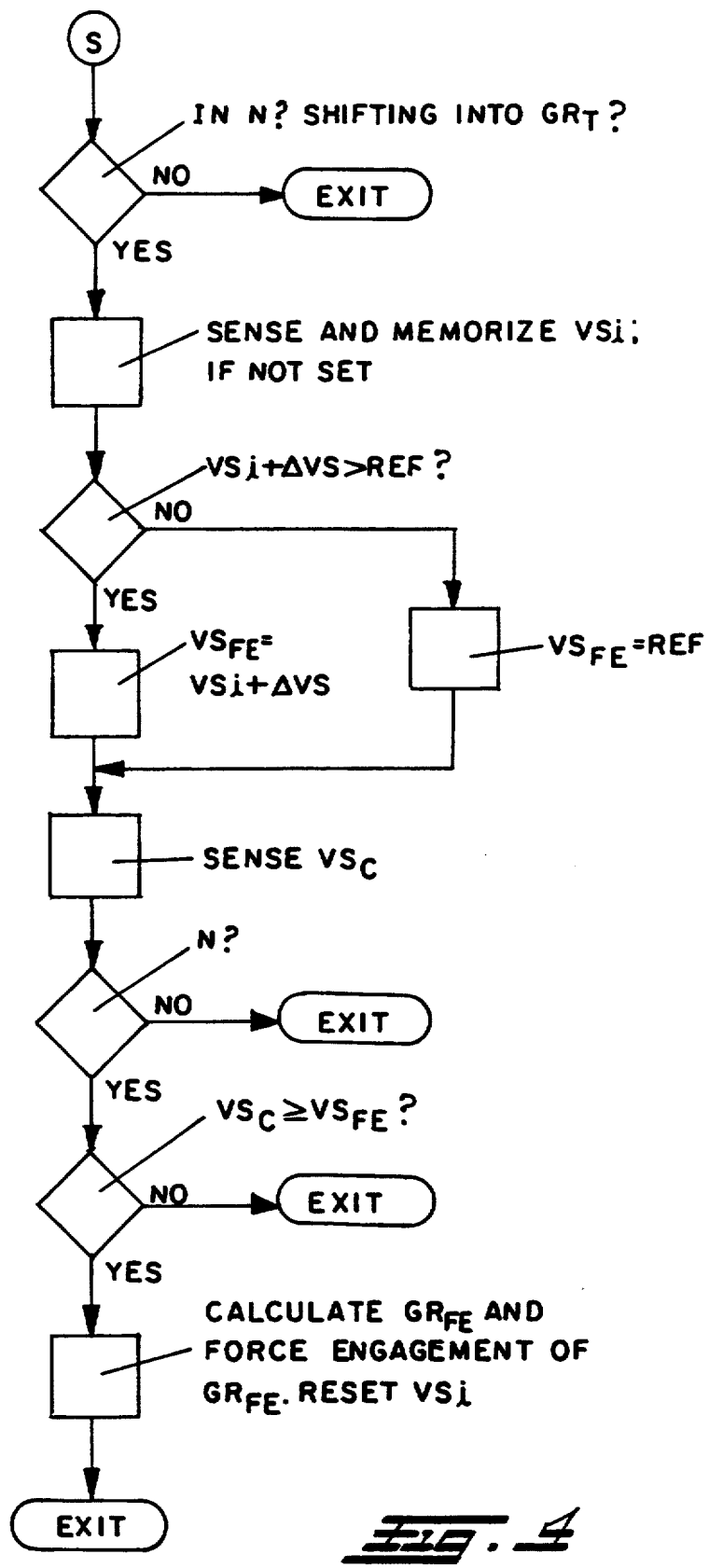
FIG. 4 is a schematic illustration, in flow chart format, of the present invention.

The forced engagement control system/method of the present invention is schematically illustrated, in flowchart format, in FIG. 4.

Although the present invention has been described with a certain degree of particularity, it is understood that various changes to form and detail may be made without departing from the spirit and the scope of the invention as hereinafter claimed.

I claim:

1. A control system (104) for controlling the implementation of selected shifts of a mechanical change gear transmission system comprising a fuel throttle controlled engine (E) having a predetermined minimum ($ES_{MIN}$) and maximum ($ES_{MAX}$) engine speed, a multispeed change gear mechanical transmission (10) having a plurality of selectably engageable gear ratios, a master friction clutch (C) drivingly interposed between the engine and the transmission, a first sensor (11/98) for providing a first input signal (ES/IS) indicative of engine rotational speed, a second sensor (100) for providing a second input signal (OS) indicative of vehicle speed (VS) and a transmission actuator (112, 70, 96) for controlling shifting of the transmission, said control system including:

means (120, 122, 124, 106) for selecting an upshift or a downshift from a currently engaged transmission ratio or from neutral to a selected target ratio ($GR_T$), and providing a third input signal indicative of said selection;

a central processing unit (106) for receiving said first, second and third input signals and for processing same in accordance with predetermined logic rules to issue command output signals, said central processing unit including;

means responsive to (i) a selection of a shift from a currently engaged ratio or from neutral into a selected target ratio and (iii) confirmation of a transmission neutral condition for (i) sensing and storing the then current vehicle speed as an initial vehicle speed $VS_i$ (ii) and thereafter sensing substantial synchronization of the transmission and (iii) thereafter for issuing command output signals to said actuator to enable the transmission to be shifted into the selected target ratio; said means sensing substantial synchronization of said transmission by comparing said first signal to a reference range determined as a function of said selected target ratio and said second signal, said control system characterized by:

said central processing unit additionally comprising:

means responsive to (i) a selection of a shift from a currently engaged ratio or from neutral into said target gear ratio, (ii) confirmation of a transmission neutral condition and (iii) thereafter failing to sense substantial synchronization of the transmission for (a) comparing current vehicle speed ($VS_C$) to the greater of (i) a reference vehicle speed ($VS_{REF}$) or (ii) the sum of the initial vehicle speed and a maximum change in vehicle speed ($VS_i + \Delta VS_{max}$), and, (b) if current vehicle speed equals or exceeds the greater of said reference vehicle speed or said sum, causing said transmission to be immediately engaged in a forced engagement gear ratio ($GR_{FE}$) determined as a function of said second input signal and said minimum and maximum engine speeds.

2. The system of claim 1 wherein said forced engagement ratio is determined independently of said first input signal.

3. The system of claims 1 or 2 wherein said reference vehicle speed equals about 30 MPH.

4. The system of claims 1 or 2 wherein said maximum change in vehicle speed ($\Delta VS_{max}$) equals about 6 MPH to 12 MPH.

5. The system of claim 3 wherein said maximum change in vehicle speed ($\Delta VS_{max}$) equals about 6 MPH to 12 MPH.

6. The system of claims 1 or 2 including means for issuing a warning at vehicle speeds (204) less than said greater of said reference vehicle speed or said sum by a second amount.

7. The system of claim 6 wherein said second amount is about three MPH.

8. A method for controlling the implementation of selected shifts of a mechanical change gear transmission system comprising a fuel throttle controlled engine (E) having a predetermined minimum ($ES_{MIN}$) and maximum ($ES_{MAX}$) engine speed, a multi-speed change gear mechanical transmission (10) having a plurality of selectably engageable gear ratios, a master friction clutch (C) drivingly interposed between the engine and the transmission, a first sensor (11/98) for providing a first input signal (ES/IS) indicative of engine rotational speed, a second sensor (100) for providing a second input signal (OS) indicative of vehicle speed (VS), a transmission actuator (112, 70, 96) for controlling shifting of the transmission, means (120, 122, 124, 106) for selecting an upshift or a downshift from a currently engaged transmission ratio or from neutral to a selected target ratio ($GR_T$), and providing a third input signal indicative of said selection, a central processing unit (106) for receiving said first, second and third input signals and for processing same in accordance with predetermined logic rules to issue command output signals, said central processing unit including;

means responsive to (i) a selection of a shift from a currently engaged ratio or from neutral into a selected target ratio and (ii) confirmation of a transmission neutral condition for (i) sensing and storing the then current vehicle speed as an initial vehicle speed $VS_i$ (ii) and thereafter sensing substantial synchronization of the transmission and (iii) thereafter for issuing command output signals to said actuator to enable the transmission to be shifted into the selected target ratio; said means sensing substantial synchronization of said transmission by comparing said first signal to a reference range determined as a function of said selected target ratio and said second signal, said method characterized by:

responsive to (i) a selection of a shift from a currently .engaged ratio or from neutral into said target gear ratio, (ii) confirmation of a transmission neutral condition and (iii) thereafter failing to sense substantial synchronization of the transmission (a) comparing current vehicle speed ($VS_C$) to the greater of (i) a reference vehicle speed ($VS_{REF}$) or (ii) the sum of the initial vehicle speed and a maximum change in vehicle speed ($VS_i + \Delta VS_{max}$), and, (b) if current vehicle speed equals or exceeds the greater of said reference vehicle speed or said sum, causing said transmission to be immediately engaged in a forced engagement gear ratio ($GR_{FE}$) determined as a function of said second input signal and said minimum and maximum engine speeds.

9. The method of claim 8 wherein said forced engagement ratio is determined independently of said first input signal.

10. The method of claims 8 or 9 wherein said reference vehicle speed equals about 30 MPH.

11. The method of claims 8 or 9 wherein said maximum change in vehicle speed ($\Delta VS_{max}$) equals about 6 MPH to 12 MPH.

12. The method of claim 10 wherein said maximum change in vehicle speed ($\Delta VS_{max}$) equals about 6 MPH to 12 MPH.

13. The method of claims 8 or 9 further including issuing a warning at vehicle speeds (204) less than said greater of said reference vehicle speed or said sum by a second amount.

14. The method of claim 13 wherein said second amount is about three MPH.

* * * * *